United States Patent
Pollock et al.

(10) Patent No.: US 8,294,401 B2
(45) Date of Patent: Oct. 23, 2012

(54) CONTROL OF ELECTRICAL MACHINES

(75) Inventors: Charles Pollock, Oakham (GB); Helen Pollock, Oakham (GB)

(73) Assignee: Technelec Ltd., Oakham (GB)

( * ) Notice: Subject to any disclaimer, the term of this patent is extended or adjusted under 35 U.S.C. 154(b) by 274 days.

(21) Appl. No.: 12/744,981

(22) PCT Filed: Dec. 1, 2008

(86) PCT No.: PCT/GB2008/003972
§ 371 (c)(1),
(2), (4) Date: May 27, 2010

(87) PCT Pub. No.: WO2009/068888
PCT Pub. Date: Jun. 4, 2009

(65) Prior Publication Data
US 2010/0301789 A1    Dec. 2, 2010

(30) Foreign Application Priority Data

Nov. 29, 2007    (GB) .................................. 0723385.1

(51) Int. Cl.
*H02P 6/18*    (2006.01)
*H02K 29/06*    (2006.01)
(52) U.S. Cl. .............................. 318/400.34; 318/400.32
(58) Field of Classification Search ............. 318/400.32, 318/400.34
See application file for complete search history.

(56) References Cited

U.S. PATENT DOCUMENTS 6,150,778 A * 11/2000 Morris ....................... 318/254.1
(Continued)

FOREIGN PATENT DOCUMENTS

EP    1 783 891 A1    5/2007
(Continued)

OTHER PUBLICATIONS

International Search Report and Written Opinion for corresponding International Application No. PCT/GB2008/003972 mailed Jun. 8, 2011.

(Continued)

*Primary Examiner* — Thomas Dougherty
(74) *Attorney, Agent, or Firm* — Renner, Otto, Boisselle & Sklar, LLP

(57) ABSTRACT

This invention relates to the control of electrical machines and is concerned more particularly, though not exclusively, with the control of flux switching brushless permanent magnet and switched reluctance electrical machines without a mechanical shaft position sensor. Brushless Reluctance and permanent magnet motors can be used in many applications, since they do not require the use of commutators or brushes in supplying electrical power to the rotor of the motor. An electrical machine is provided for converting electrical energy into mechanical energy and/or mechanical energy into electrical energy, the machine comprising a stator and a rotor, the stator having one or more electrical windings wherein at least one electrical parameter of the windings have a cyclic variation related to rotor position; at least one control device for controlling supply of electrical current to or from the or each said electrical winding, and at least one rotor position sensor means for detecting at least one electrical signal related to the cyclic variation of at least one electrical parameter of the or each said electrical winding wherein at least one said rotor position sensor means comprises the steps of measuring the said electrical signal at least once during any part of a switching cycle, conversion of the at least one measured electrical signal to a ratiometric quantity representative of an estimate of the rotor position corresponding to the at least one measured electrical signal and using the said ratiometric quantity in a calculation to maintain the current passing through the or each said electrical winding in synchronism with rotor rotation.

14 Claims, 8 Drawing Sheets

U.S. PATENT DOCUMENTS

| | | | |
|---|---|---|---|
| 6,534,938 B1 * | 3/2003 | Wu et al. | 318/400.28 |
| 6,788,020 B1 | 9/2004 | Pollock et al. | |
| 6,897,591 B2 * | 5/2005 | Peachee et al. | 310/166 |
| 7,298,106 B2 * | 11/2007 | Yamamoto et al. | 318/400.27 |
| 7,412,339 B2 * | 8/2008 | Ramu et al. | 702/65 |
| 2003/0234629 A1 | 12/2003 | Trifilo | |
| 2006/0197396 A1 | 9/2006 | Pollock et al. | |
| 2011/0037422 A1 * | 2/2011 | Pollock et al. | 318/400.34 |

FOREIGN PATENT DOCUMENTS

| | | |
|---|---|---|
| GB | 2 454 170 A | 5/2009 |
| GB | 2 454 171 A | 5/2009 |
| WO | 2004/025822 A1 | 3/2004 |

OTHER PUBLICATIONS

Bausch et al., "Determination of the Initial Rotor Position Angle of Separately Excited Synchronous Machines", Proceedings of the Second Chinese International Conference on Electrical Machines, CICEM '95, vol. 1, Aug. 31, 1995, pp. 113-118, XP002638412.

Pollock et al., "Low Cost, High Power Density, Flux Switching Machines and Drives for Power Tools", IEEE IAS Annual Meeting 2003 (cited on p. 1, line 26 of the specification).

Pollock et al., "Flux-Switching Motors for Automotive Applications", IEEE Transactions in Industry Applications, vol. 42, No. 5, Sep. 2006, pp. 1177-1184 (cited on p. 1, line 29 of the specification).

Cheng et al., "A Permanent Magnet Flux Switching Motor for Low Energy Axial Fans", Fourtieth ISA Annual Meeting Conference Record, vol. 3, Oct. 2-6, 2005, pp. 2168-2175 (cited on p. 1, line 35 of the specification).

Rauch et al., "Design Principles of Flux-Switch Alternators", AIEE Trans., vol. PAS-74, pp. 1261-1268, 1955 (cited on p. 1, line 38 of the specification).

* cited by examiner

CONTROL OF ELECTRICAL MACHINES

This invention relates to the control of electrical machines and is concerned more particularly, though not exclusively, with the control of flux switching, brushless permanent magnet and switched reluctance electrical machines without a mechanical shaft position sensor.

Brushless permanent magnet and reluctance motors can be used in many applications, since they do not require the use of commutators or brushes in supplying electrical power to the rotor of the motor. Since these components are subject to significant wear, it is highly desirable to avoid their use. Brushless permanent magnet machines offer high efficiency due to the inclusion of permanent magnets on the rotor. By comparison, the rotors of flux switching and switched reluctance machines have salient teeth with no windings or permanent magnets. These rotors are therefore simple to manufacture and very robust. They are therefore suitable for many applications including very high speed electrical machines.

FIG. 1 shows a flux switching machine with 8 stator teeth and 4 rotor teeth as described in U.S. Pat. No. 6,788,020. This motor contains a field winding in slots 1, 3, 5, 7 of the stator 10 and an armature winding in slots 2, 4, 6, 8 of the stator 10. The rotor, 11, is a salient pole rotor made from laminated steel with 4 rotor teeth, 9. This motor operates with direct current in the field winding and alternating current in the armature winding. The direct current in the field winding creates a four pole stator flux pattern which links the armature winding in a positive or negative direction as the rotor turns from alignment with stator teeth 21, 23, 25, 27 to alignment with stator teeth 22, 24, 26, 28. This alternating flux linking the armature generates an internal emf in the armature. The machine can be used as a motor or generator by controlling the armature current to be in phase (motor) or out of phase (generator) with the armature emf. This machine provides a simple and easy to manufacture structure and gives excellent control flexibility with easy variation of both field current and armature current.

The operation of the flux switching machine has been described in published papers. In a paper "Low cost high power density, flux switching machines and drives for power tools", in IEEE IAS Annual Meeting 2003 by H. Pollock, C. Pollock, R. Walter and B. Gorti, the operation of the machine with field winding in both series and shunt configurations relative to the armature switching circuit is described. In a paper "Flux switching machines for automotive applications" by C. Pollock, H. Pollock, R. Barron, J. Coles, D. Moule, A. Court, R. Sutton, published in IEEE Transactions in Industry Applications Vol. 42 No. 5, September 2006, pp 1177-1184, the operation of the machine as a motor with bifilar armature windings is described.

FIG. 2 shows a further flux switching machine, also from the prior art, as described in a paper "A permanent magnet flux switching motor for low energy axial fans", Y. Cheng; C. Pollock and H. Pollock; Fortieth IAS Annual Meeting Conference Record, Volume 3, 2-6 Oct. 2005 Page(s):2168-2175. This motor is the four pole version of a two pole machine first described in a paper "Design principles of flux switch alternator," S. E. Rauch and L. J. Johnson, AWE Trans., vol. PAS-74, pp. 1261-1268, 1955. The stator 30 of FIG. 2 employs four permanent magnet sections 31, 33, 35 and 37 interspersed between four laminated stator sections 32, 34, 36 and 38 each carrying a slot for the armature winding. As in the motor of FIG. 1 rotation of the rotor 11 causes a cyclical variation in the flux linking the armature winding and hence induces an emf in the armature winding. The emf is proportional to speed and unlike the machine in FIG. 1 the field flux produced by the permanent magnets cannot be altered significantly as there is no field winding. The machine of FIG. 2 therefore provides a machine of high efficiency since the magnetic field is produced without copper losses in a field winding. Flux switching machines which incorporate field windings and permanent magnets are also possible as disclosed in UK Patent Applications 0721074.3 and 0721077.6.

Operation of all the prior art flux switching machines including those shown in FIGS. 1 and 2 as a motor or as a generator requires the current in the armature winding to alternate in synchronism with the internal emf induced within the armature winding due to the field flux. Armature current would be controlled during a positive and negative conduction block, the frequency of current reversals from a positive armature conduction block to a negative armature conduction block determined by the required speed of rotation of the rotor and the magnitude of the current in each armature conduction block determined by the torque requirement of the load, or may be simply limited by the speed of rotation of the machine and the size of the internal armature emf.

FIG. 3 shows a plot of the variation in self and mutual inductance in the field and armature windings of a typical flux switching machine such as the one shown in FIG. 1. The graph shows Line 81 which is the self inductance in pH per turn and per metre of stack length for the field winding and the armature winding. Since both the field winding and the armature winding span two stator teeth and both span one rotor pole pitch the flux linking the winding due to its own current is relatively constant. The small variation with rotor angle can be explained by variations due to fringing at the edges of the teeth. The self inductance of the field or the armature offers very limited possibility for position dependent information. The graph also shows Line 82 which is the mutual inductance between field winding and armature winding in μE, per turn per m. The mutual inductance is strongly position dependent varying from a positive maximum near to 0° to a negative maximum near to 45°.

The torque in a flux switching motor is given by:

$$T = \frac{1}{2}i_a^2 \frac{dL_a}{d\theta} + \frac{1}{2}i_f^2 \frac{dL_f}{d\theta} + i_a i_f \frac{dM}{d\theta} \tag{1}$$

As the windings of a flux switching machine are pitched over two stator teeth and span one rotor tooth pitch, the self inductance of the windings in the flux switching machine are relatively constant. There is therefore little torque produced by the variation in self inductance. The rate of change in mutual inductance creates the possibility for torque production so the torque in a flux switching machine with armature and field windings can be approximated by:

$$T = i_a i_f \frac{dM}{d\theta} \tag{2}$$

Therefore when the rate of change of mutual inductance with respect to increasing rotor angle is positive, and if field current and armature current are both positive, then positive torque will be produced. Positive torque will act to turn the rotor to positive increasing angle.

When the rate of change of mutual inductance with respect to increasing rotor angle is negative, field current is positive but armature current is negative, then positive torque will again be produced. Positive torque will act to turn the rotor to positive increasing angle.

Since the mutual inductance varies as shown in FIG. 3, the maximum torque for each polarity of armature current occurs either side of the region where the mutual inductance passes through zero. The aim of a control system for a flux switching motor, operating without a position sensor would therefore be to apply armature current of the correct polarity, centrally positioned between the turning points in the mutual inductance characteristic. However, to achieve this at all speeds, requires the timing of the application of positive and negative voltage to the armature winding to be very accurately controlled. At low speeds the machine back emf is quite low. In a motor where the back emf will be opposing the initiation of armature current, a low back emf means that the armature current can rise relatively fast and the required current level can be reached a very short time after the voltage is applied. As the rotor speed is low, this corresponds to a small angle of rotor rotation. However, the simple rotor structure of a flux switching machine gives them a major advantage over many other types of machines. At very high rotor speeds there are no magnets or coils to be attached to the rotor. Flux switching machines therefore can spin at very high rotor speeds and applications exist for electric machines to spin at speeds up to and in excess of 100,000 r/min. At such speeds, the back emf will be higher and the rise of armature current takes a much greater angle of rotor rotation. The position of the voltage switching points must be carefully chosen to be ahead or in advance of the time where the current is to flow. Small errors in the calculation of such timing can result in significant loss in machine performance.

In order to control rotation of the rotor 11 relative to the stator 10, reversal of the direction of current flow in the windings of the armature windings must be accurately synchronised with rotation of the rotor 11 relative to the stator 10. In order to control the switching of the current through the armature windings, therefore, existing flux switching motors needed to be provided with means for indicating the rotational position of the rotor 11. This was usually an optical or magnetic position sensor mounted to the rotor shaft, the operation of which will be familiar to persons skilled in the art and will therefore not be described in more detail. Such position sensors need to be very accurately aligned during manufacture of the motor, which in turn significantly increases the cost of manufacture of the motor. For high rotational speeds positional errors of a fraction of a degree have a significant impact on machine performance.

WO 2004/025822 discloses a flux switching motor in which switching of the polarity of voltage pulses applied to the armature coils of the motor can be controlled without the use of a mechanical rotor position sensor. Since a flux switching motor has field coils and armature coils, each with a pitch double that of stator teeth, the magnetic fields generated in one coil link through an adjacent coil. As a result of this overlap, there is significant mutual inductance between the armature and field coils, the mutual inductance being dependent upon the rotational position of the rotor. This enables the rotational position of the rotor to be determined by monitoring voltages induced in the field windings as a result of current flow in the armature windings.

In WO 2004/025822 methods of maintaining synchronism with rotation of the rotor without use of a mechanical shaft sensor were described for low speed operation and for high speed operation. At high motor speeds, when current is controlled by a single pulse of current in each armature conduction block WO 2004/025822 used the fact that excitation of the armature switches induced a voltage in the field winding which was a function of the mutual coupling between the field winding and the armature winding which in turn was a function of position. The induced voltage in the field winding then caused a variation in the gradient of the field current. A comparator was used was detect the point in the armature conduction block when the gradient of the field current changed from positive to negative. It was assumed that this was a known point mid way through the armature conduction cycle where the mutual inductance between field and armature changed sign. The controller would record the time from the start of the pulse to when the comparator changed state and would maintain that time to be a pre-calculated function of the total length of the armature pulse at the particular load and speed. There are significant limitations of the methods disclosed in WO 2004/025822.

Firstly, under some conditions the gradient of the field current would not become negative and a signal was not obtained on the comparator. This was particularly true when the motor was accelerating rapidly and the currents in the motor were increasing. The gradient of the field current could therefore be positive for several cycles and the comparator would provide no information about rotor position whatsoever. Secondly, another reason for the induced gradient in the field current dropping to zero and triggering the comparator was if the armature voltage was supported by a relatively small capacitor. Under certain conditions the armature voltage would drop to zero during the armature current pulse and the mutually induced gradient would also drop to zero. This was not a position related signal. The methods disclosed in WO 2004/025822 therefore can result in the motor losing position feedback information or getting unreliable data and as a result the control of the motor can be unstable. The methods disclosed in WO 2004/025822 do not therefore work over the complete range of voltage, power supply topologies and are particularly limited when operated over a wide speed range.

European Patent Application EP1783891 provides an improvement to WO 2004/025822 which is particularly beneficial when there is significant changes in the voltage across the armature winding. EP1783891 recognises that the induced rate of change of field current is a function of both the armature supply voltage as well as the mutual inductance between armature and field windings. EP1783891 uses a division method to eliminate the variation in armature supply voltage in a differentiator coil to leave a voltage signal, the variation in which is strongly related to position. EP1783891 provides a method for the extraction of a position dependent voltage from a differentiator coil but does not provide any detailed methods to use this voltage signal in a time and angle control loop to control the timing and position of an armature current pulse relative to rotor position over the whole range of motor speeds and loads.

Therefore there is no solution drawn from the prior art which provides a robust method for the detection of the position of the rotor of a flux switching machine and controlling the motor over the whole range of motor speeds and loads, particularly under rapid accelerations without using a mechanical shaft position sensor.

The torque in a flux switching motor is given by:

$$T = \frac{1}{2}i_a^2 \frac{dL_a}{d\theta} + \frac{1}{2}i_f^2 \frac{dL_f}{d\theta} + i_a i_f \frac{dM}{d\theta} \quad (3)$$

The windings of a flux switching machine are wound with a short pitch around each stator tooth and therefore each phase winding has a very significant variation in self inductance. In contrast to the flux switching machine, as there is no overlap between adjacent phase windings the mutual inductance of the windings are very small and relatively constant. There is therefore little torque produced by the variation in self inductance. The torque in a switched reluctance machine is produced if current flows in a phase winding when its self inductance is changing. The torque in each phase winding of a switched reluctance machine is given by: The torque in a flux switching motor is given by:

$$T = \frac{1}{2} i_{ph}^2 \frac{dL_{ph}}{d\theta} \qquad (4)$$

The sign of the torque output of the switched reluctance motor is determined by the sign of the rate of change of phase winding inductance. It is not dependent on the direction of current. As a result a switched reluctance motor uses pulses of unidirectional current, resulting in simpler power electronic controllers compared to motors requiring bi-directional current.

In common with the flux switching motor optimum torque production relies on synchronising the current with the cyclic variation in an inductance characteristic, in this case self-inductance rather than mutual inductance. Many methods have been described in the literature for the control of the switched reluctance machine without sensors. However most of these methods rely on complex non-linear magnetic machine models to compare measured flux and current with stored data. These methods suffer from inaccuracies due to component variations and tolerances. These are also complex mathematically, requiring an expensive controller. This also limits the operating speed of a machine without sensors as the computation time can be significant.

It is the object of this invention to provide a method of operation of an electrical machine such as a flux switching machine or a switched reluctance machine without the use of a mechanical position sensor which can operate over the entire range of motor operating speeds and can deliver high and controlled torque, operate under conditions of rapidly changing loads or speeds and operate when the current in the machine is changing rapidly due to voltage variations or fast accelerations. The present invention will overcome the limitation of the prior art methods and unlike sensorless control schemes for other motors it will be achieved with very simple mathematical relationships, thus allowing the control scheme to be implemented in a low cost controller while rotating over a full range of motors speeds including high rotor speeds of 100,000 r/min and above.

An electrical machine is provided for converting electrical energy into mechanical energy and/or mechanical energy into electrical energy, the machine comprising a stator and a rotor, the stator having one or more electrical windings wherein at least one electrical parameter of the windings have a cyclic variation related to rotor position;

at least one control device for controlling supply of electrical current to or from the or each said electrical winding, and at least one rotor position sensor means for detecting at least one electrical signal related to the cyclic variation of at least one electrical parameter of the or each said electrical winding wherein at least one said rotor position sensor means comprises the steps of measuring the said electrical signal at least once during any part of a switching cycle, conversion of the at least one measured electrical signal to a ratiometric quantity representative of an estimate of the rotor position corresponding to the at least one measured electrical signal and using the said ratiometric quantity in a calculation to maintain the current passing through the or each said electrical winding in synchronism with rotor rotation.

The at least one electrical signal may correspond to the rate of change of an electrical current in at least on electrical winding of the machine.

The at least one electrical signal may correspond to the rate of change of a magnetic flux in a part of the electrical machine.

According to a further aspect of the invention the ratiometric quantity is converted directly into a time quantity by multiplication by a time representing a proportion of the period of the cyclic variation in the electrical parameter.

The rotor position sensor means may further determine an error time value between the said time quantity and a target time.

According to a further aspect of the invention the rotor position sensor means includes a period observer based on integration or summation of the error time values.

According to a further aspect of the invention the ratiometric quantity is converted directly into an angle quantity by multiplication by an angle representing a proportion of the angle corresponding to the cyclic variation in the electrical parameter and determines an error angle value between the said angle quantity and a target angle.

According to a further aspect of the invention the electrical machine system according to any of the preceding claims, the rotor position sensor device uses the error time value in a position control loop.

According to a further aspect of the invention the rotor position sensor device uses the Period Observer in combination with the error time value in a position control loop.

According to a further aspect of the invention the electrical machine system also has at least one field magnet device for generating a first magnetomotive force between said rotor and said stator and including at least one first electrical winding, and (ii) at least one armature magnet device including at least one second electrical winding adapted to carry electrical current varying in synchronism with rotation of said rotor relative to said stator to generate a second magnetomotive force having a component transverse to said first magnetomotive force, at least one control device controlling supply of electrical current to or from the or each said second electrical winding wherein the electrical current in the or each said second electrical winding has positive and negative conduction blocks; and the at least one rotor position sensor means detects at least one electrical signal related to the rotational position of the rotor relative to the stator induced in a respective said first or second electrical winding as a result of a current passing through a respective second or first electrical winding, wherein at least one said rotor position sensor means comprises the steps of conversion of the at least one electrical signal to a ratiometric value representative of angle and using the said value in a calculation to control the subsequent current passing through the or each said electrical winding.

In a yet further aspect of the invention the rotor carries at least one magnet and the electrical machine is a brushless permanent magnet machine and the electrical parameter with the cyclic variation is the induced emf in an electrical winding on the stator due to the rotation of the rotor.

Preferred embodiments of the present invention will now be explained with reference to the following Figures in which.

Figure 4:
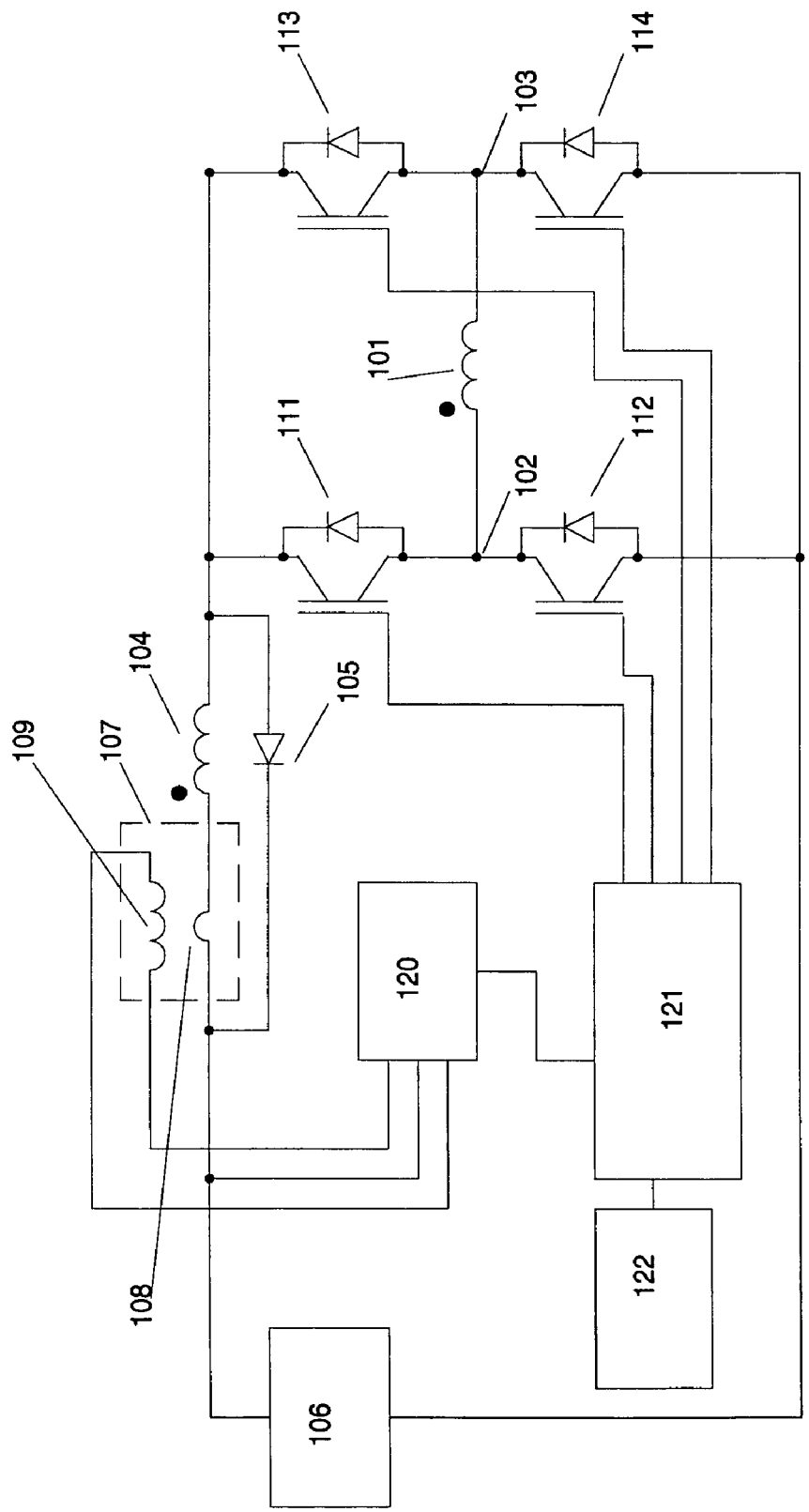
FIG. 4 shows a control circuit for a flux switching machine incorporating one aspect of the invention.

FIG. 4 shows a control circuit for a flux switching machine incorporating one aspect of the invention. An armature winding 101 of a flux switching motor is connected to the first 102 and second 103 switching nodes of a power electronic inverter. Each leg of the inverter comprises two power electronic switches. FIG. 4 shows these switches as insulated gate bipolar transistors though mosfets or other semiconductor switches can be used. The field winding 104 of the flux switching motor is connected in series with the power supply connection to the power electronic inverter. A diode 105 around the field winding provides an additional current path when field current is greater than armature current or when armature switches are turned off. The whole circuit is connected to a power source 106 which may be dc such as a battery or may be a dc power supply created from the rectification of an ac power supply. In either case it is not necessary for the dc power source to be smooth or constant. If the power supply is derived from rectification of an ac power supply it will be common to find a significant modulation of the dc voltage being supplied to the motor circuit.

FIG. 4 also contains a differentiating coil 107 for providing a signal related to the rate of change of the field current flowing in the field winding 104, as disclosed in WO 2004/025822. The primary 108 of the differentiating coil is in series with the field winding 104 and carries the field current. The secondary 109 of the differentiating coil 107 links the flux associated with the field current flowing in the primary 108 and is connected to the sensorless conditioning circuit 120, details of which will be described later. The voltage across the secondary of the differentiator coil 107 is therefore directly related to the rate of change of field current. The signals produced by the sensorless conditioning circuit 120 are passed to a signal controller 121. The signal controller 121 also receives information from an application controller 122 which may be as simple as on/off commands but in more complex motor drives may issues requests for operating speeds or operating torques. The signal controller 121 uses the information from the sensorless conditioning circuit 120 to determine the required switching states of the switches 111, 112, 113 and 114 in the power electronic inverter, in order to control the motor to follow as closely as possible to the requirements of the application controller 122. In motor circuits where there is variation in the value of the dc supply voltage provided to the circuit it is advantageous to have an additional connection between the dc supply voltage and the sensorless conditioning circuit 120 so that the value of the dc supply voltage can be monitored.

Figure 1:
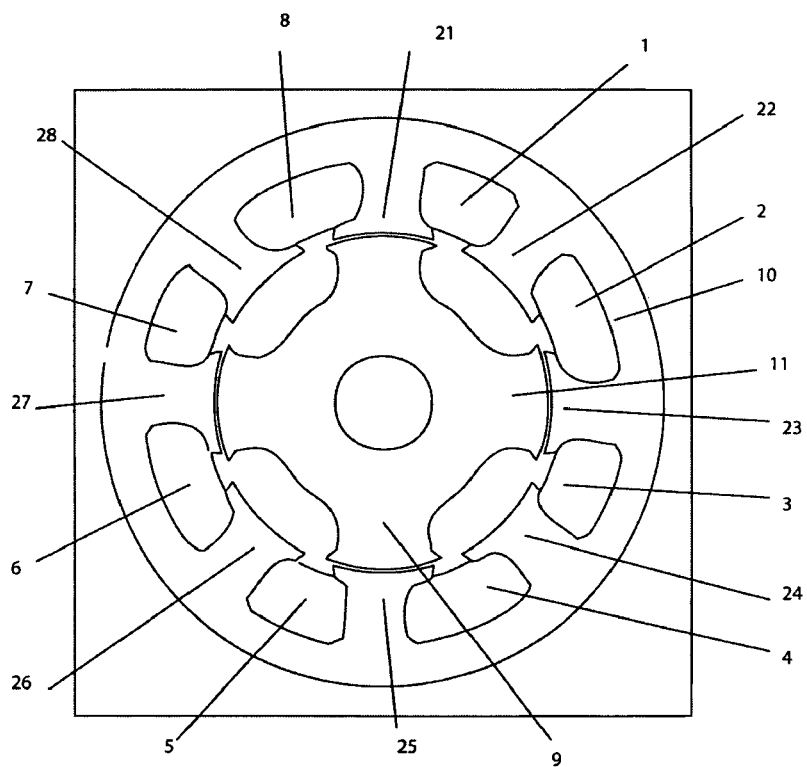
FIG. 1 and FIG. 2 shows a prior art flux switching machines.
Figure 2:
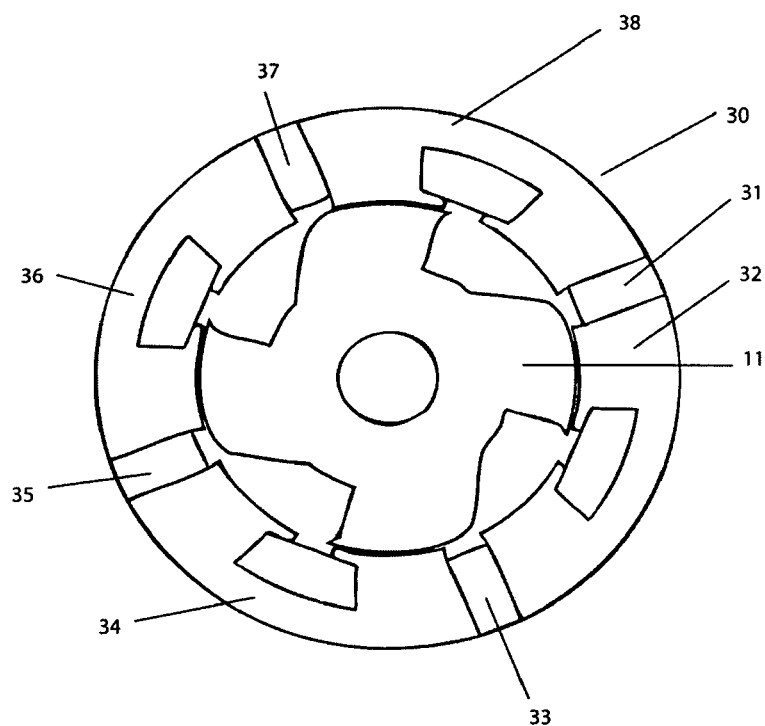
Figure 3:
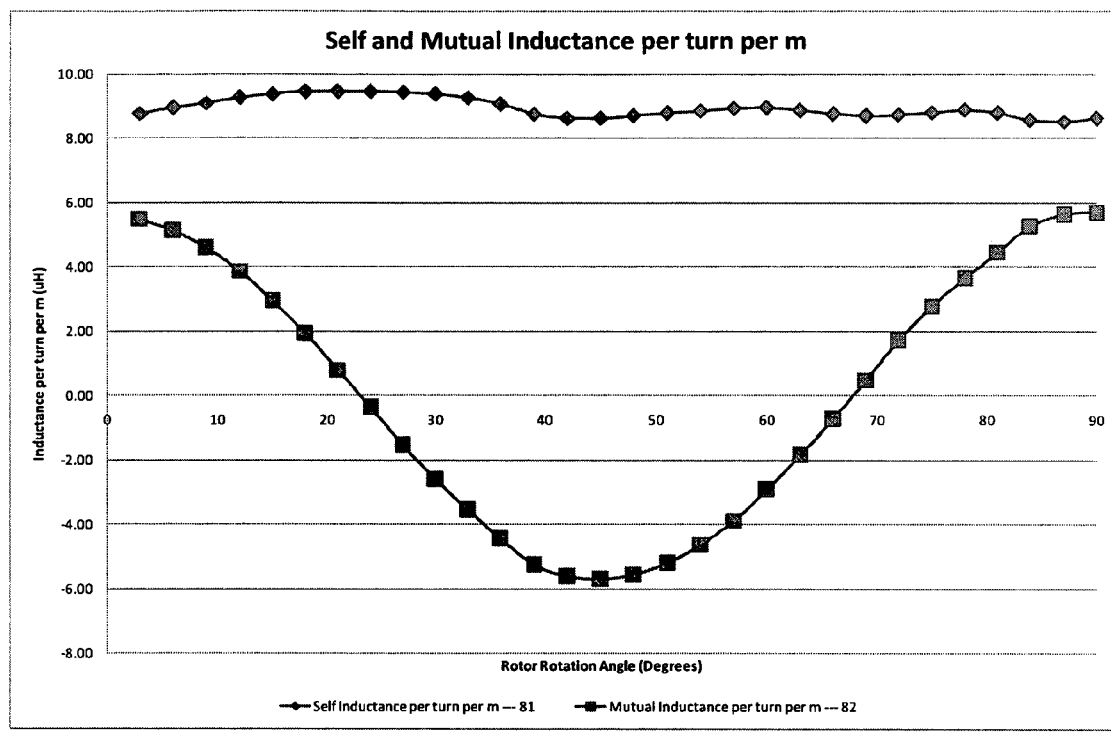
FIG. 3 shows a plot of the variation in self and mutual inductance in the field and armature windings of a typical flux switching machine such as the one shown in FIG. 1
Figure 5:
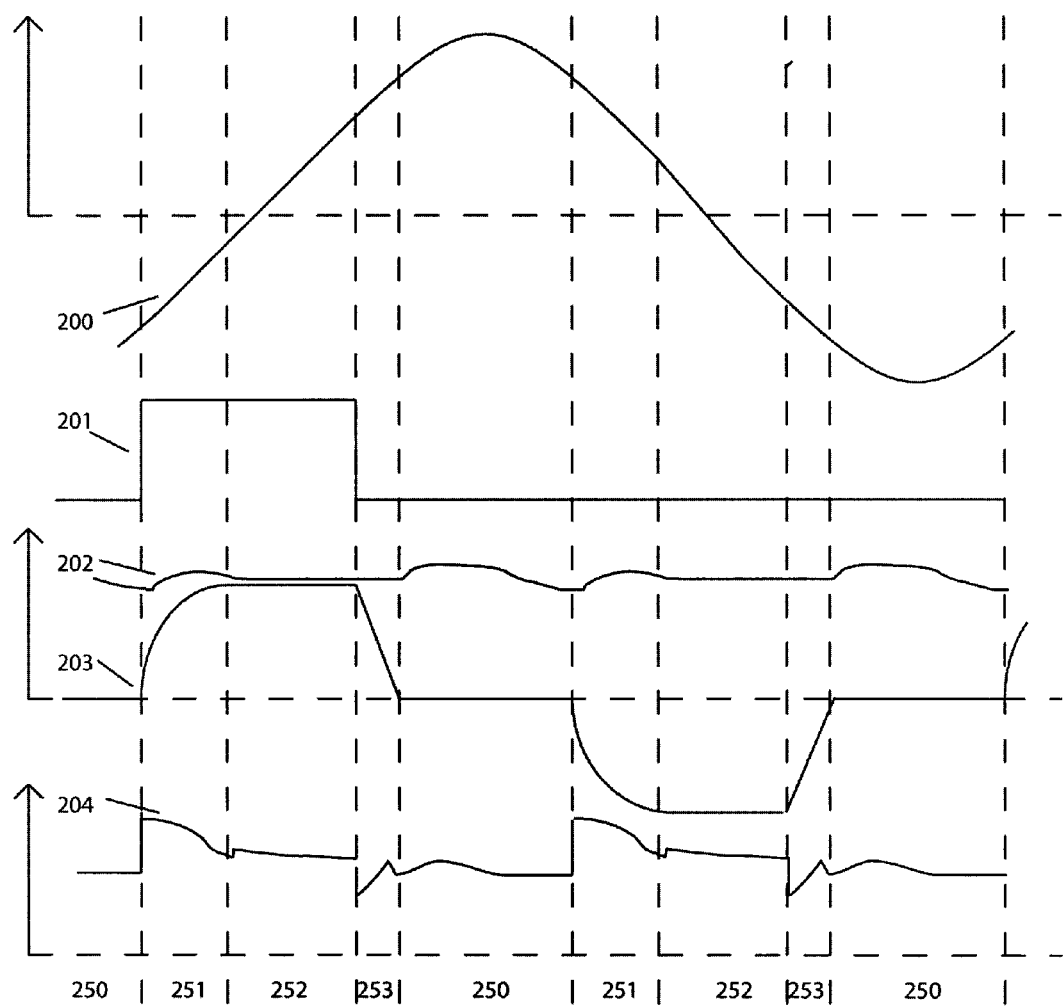
FIG. 5 shows the current and voltage waveforms of a motor operating according to the present invention.

The operation of the circuit in FIG. 4 according to the present invention will now be described with reference to FIG. 5. FIG. 5 shows the current and voltage waveforms of a motor operating according to the present invention. Trace 200 shows the mutual inductance variation in a typical flux switching machine. One complete cycle of the mutual inductance corresponds to 90° of rotor rotation of the rotor in FIG. 1. Trace 201 shows the output signal which could be applied to both switches in one diagonal pair of the power electronic inverter switches, for example switches 111 and 114. The timing and position of this pulse has been calculated in the signal controller 121 according to the invention. When switches 111 and 114 are turned on by the high state of Trace 201 in FIG. 5, node 102 is connected to the positive supply rail of the power source via the field winding 104. Node 103 is connected to the less positive (usually referred to as zero) supply rail of the power source. A current may therefore flow from the positive supply rail through the field winding and the armature winding returning to the zero supply rail of the power source. During normal rotation of the motor the current in the field winding (Trace 202) will have a substantially dc component, whereas the armature current (Trace 203) will have times of positive current alternating with times of negative current. Trace 202 in FIG. 5 shows the field current relative to the centre line of the bi-directional armature current in Trace 203. In a flux switching motor such as illustrated by FIGS. 1 and 2, where there are 8 stator teeth and 4 rotor teeth the current in the armature would reverse with every 45° of rotor rotation. It can also be observed in FIG. 5 that in the circuit of FIG. 4 it is not possible for the magnitude of the positive or negative armature current to exceed the value of field current since they are series connected. Trace 204 shows the voltage induced across the secondary terminals of the differentiator coil 107. This signal is representative of the rate of change of field current 202.

The purpose of a sensorless controller for a flux switching motor is to determine the ideal switching points for armature voltage to control the armature current relative to the mutual inductance characteristic 200 while also maintaining the required speed and torque. Each cycle of armature current is divided into a positive armature conduction block and a negative armature conduction block. The mutual inductance varies between negative and positive maximum values.

Trace 201 shows that the gate signals to transistors 111 and 114 are taken to a high or "on" condition. Current builds up rapidly in the armature winding in a positive direction (Trace 203). Initially the value of the armature current will be less than the field current as the field current (Trace 202) maintains a positive dc value during times when the armature current reverses. When the armature current reaches the field current value at point 210 the gradient of the armature current decreases sharply. The field current and armature current are now equal and are connected in series across the supply voltage. The diode 105 now stops conducting and there will be a sharp drop in the voltage applied across the armature winding as a significant voltage is dropped across the field winding. The inductance of both armature and field windings and the internal back emf of the armature winding oppose the build up of the current and the rate of rise of current decreases and may in some cases become negative. Significant torque is produced by the motor in this region because both the armature and field windings carry high levels of current and the rotor is part way between alignment with one set of stator teeth and the alternate set of stator teeth. For optimum operation this central part of each armature current pulse should coincide with the maximum rate of change of the mutual inductance characteristic.

In the typical example illustrated by FIG. 5 there are four operating states in each armature half cycle. The states are 250, 251, 252 and 253. State 250 occurs when both the switches in the armature inverter are switched off and there is no armature current flowing at all. The field current (Trace 202) is flowing in the diode 105 and the voltage across the field winding is clamped to the diode forward voltage. The field current is seen to decay slowly during this time. State 250 will be referred to as a zero-state.

State 251 immediately follows a zero-state and occurs when the armature switches are turned on to start to increase the current in the armature winding. In State 251 the difference between the field current and the magnitude of the armature current flows in the diode 105 and the voltage across the field winding is still clamped to the diode forward voltage. State 251 will be referred to as an active-state. Closer inspection of the active state associated with the positive armature conduction block shows a positive rate of change of armature current. The rate of change of armature current produces an induced voltage within the field winding which is dependent on position of the rotor and the instantaneous value of the mutual inductance between the armature and the field windings. It is usual for the active-region of a positive armature current pulse to be coincident with a negative value of mutual coupling and therefore, during the early part of the active region, to induce a negative voltage in the field winding. Such a negative voltage internal to the field winding causes a positive rate of change in field current as can be observed in Trace 202.

Figure 6:
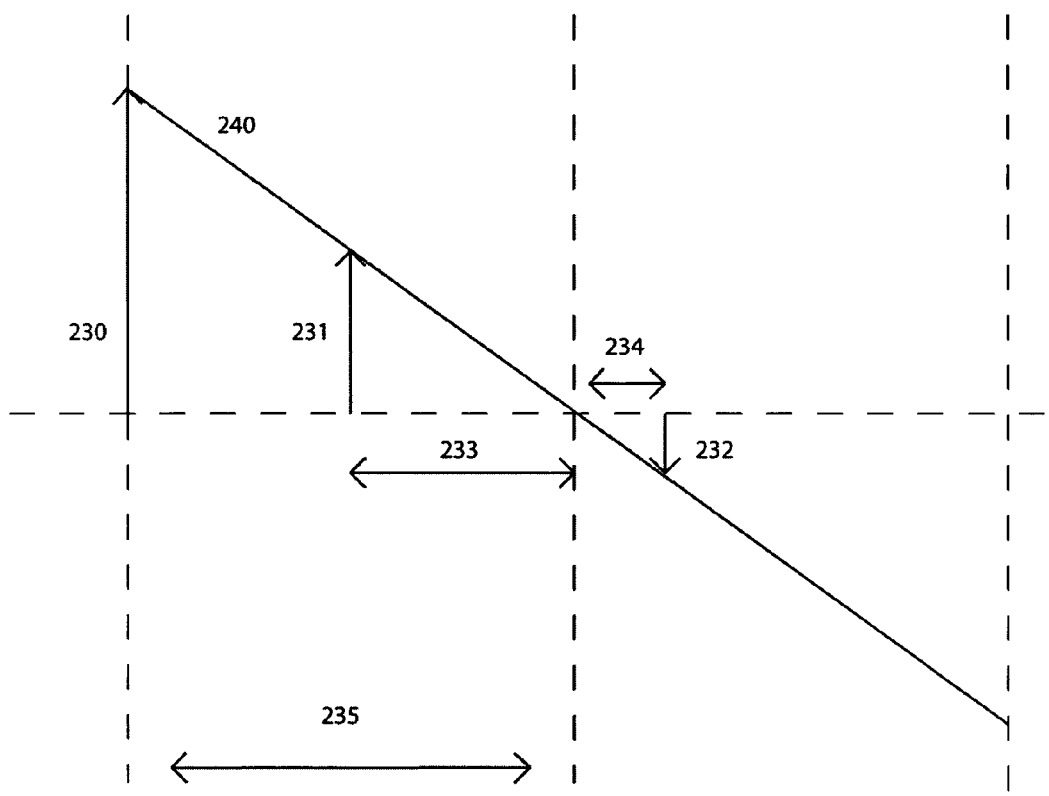
FIG. 6 shows a variation in the differentiator voltage over a half an electrical cycle.

The third state illustrated in FIG. 6 is State 252 which occurs if the armature current becomes equal to the field current and the diode 105 is therefore pulled out of conduction.

In state 253 the armature switches 111 and 114 are both turned off, negative voltage is applied across the armature winding forcing the armature current to decrease to zero. Most significantly, the field current actually rises during this time due to the mutually induced voltage between armature and field. The negative armature voltage and negative rate of change of armature current during state 253 induces a negative voltage within the field which makes it easier for field current to flow causing a positive rate of change of field current. State 253 is known as the return-state.

Trace 204 is typical of the voltage induced in the secondary of a differentiator coil 107 coupled to a conductor carrying the field current. This voltage is representative of the rate of change of field current. The rate of change of field current is controlled by two significant factors:

The voltage across the field winding;
The product of the voltage applied to the armature winding multiplied by the mutual coupling between armature and field.

Since the voltage across the field winding in states 250, 251 and 253 is the same (equal to the forward voltage of the diode 105), any change in the voltage induced in the secondary of a differentiator coil between states 253, 250 and 251 is due to the change in the armature voltage between the zero-state and the active-state or between the return-state and the zero-state. Under full power conditions the armature pulse width will be increased. It is possible that the zero-state 250 will decrease in size and may disappear altogether. If this happens the return state 253 will be immediately followed by an active-state 251. If the motor is running from a relatively constant dc source the magnitude of any change in the voltage induced in a differentiator coil between a zero-state and an active-state will be representative of the mutual coupling between armature and field windings.

Operation of the signal controller according to the invention allows optimum positioning of each armature current pulse to be achieved over a wide speed and torque range while operating the machine without a mechanical sensor. The operation of the signal controller 121 to control the timing of the armature switching relative to the mutual inductance characteristic will now be explained in more detail. Implementation of the invention according to the invention may be achieved with the following sequence of operations:—

(i) During the zero-state 250 immediately before the kth armature pulse, the voltage across the differentiator coil 107 is measured and stored as $DV_{zero\text{-}state(k)}$.

(ii) After the prescribed duration of the $Off\_time_k$ the armature switches 111 and 114 are turned on to create a positive step change in the armature voltage and initiate the active-state.

(iii) A timer is started to deliver the required pulse length, $Pulse\_time_k$.

(iv) Wait for the $Advance\_delay\_time_k$. This Advance_delay_time should have a minimum value which allows for the switching transient to settle and for the differentiator coil to settle to a value representative of the rate of change of field current in the active-state, 251. In addition a further delay time can be added before sampling the voltage in the active-state 251; this delay time will therefore be a function of the control scheme according to the invention and the total delay will be referred to as the Advance_delay_time.

(v) The voltage induced in the differentiator is sampled at the advance delay time after the armature switches are turned on and stored as $DV_{active\text{-}state(k)}$. The measurement of the voltages can be conveniently achieved using a microcontroller and analogue to digital converter or by analogue circuit techniques.

(vi) Implement Calculation Block to calculate $Off\_time_{k+1}$, $Pulse\_time_{k+1}$, and update Period Observer. The Calculation Block is described in more detail below. The Period Observer is a time observer which keeps track of the repetition time of each armature current pulse. In the flux switching motor such as shown in FIG. 1 with eight stator teeth and four rotor teeth, the repetition time is the time taken for the rotor to rotate through 45°. The Period Observer maintains an estimate of the periodic time (or half the periodic time) of the mutual inductance characteristic between the armature winding and the field winding. As the motor speed varies the Period Observer needs to track changes in the periodic time of the mutual inductance characteristic. The Period Observer is therefore an essential part of the signal controller. For the purposes of this example the time for half the period of the mutual inductance characteristic will be taken as the output of the Period Observer and will be referred to as Htime.

(vii) Wait for $Pulse\_time_k$ to end.

(viii) Turn off the armature switches.

(ix) Start timer for $Off\_time_{k+1}$.

(x) Repeat procedure using the opposite pair of Amature Switches for the next pulse.

The Calculation Block (step (vi) above) will now be described in more detail.

On entry to the calculation block in the kth armature pulse, two new differentiator voltage readings will be available; $DV_{active\text{-}state(k)}$ and the earlier $DV_{zero\text{-}state(k)}$. The difference between these two readings is determined to give the magnitude of the change in differentiator voltage which has been created by the armature switching transition step. The differentiator voltage step in the kth armature pulse is therefore given by $$DV_k = DV_{active\text{-}state(k)} - DV_{zero\text{-}state(k)} \quad (5).$$

The differentiator coil voltage step contains information about the rotor position but is also dependent on armature supply voltage. If the armature supply voltage is variable the differentiator coil voltage step can be normalised by a division step which can be implemented according to the methods described in European Patent Application EP1783891.

The differentiator voltage, normalised if required, is then converted into a ratiometric quantity representative of an estimate of the rotor position corresponding to the measurement point of the differentiator voltage in the active state. The ratiometric quantity is Dratio, and corresponds to the ratio of $DV_k$ to maximum of the differentiator voltage, DVmax, $$Dratio_k = \frac{DV_k}{DV_{max}}, \quad (6)$$

Since the angle over which the differential voltage changes from its maximum value to zero is one quarter of an electrical cycle, the ratiometric quantity can be converted into a time, $Dtime_k$, given by $$Dtime_k = Dratio_k * \frac{Htime_{k-1}}{2} \quad (7)$$

Or combining equations (6) and (7) into one step gives $$Dtime_k = \frac{DV_k * Htime_{k-1}}{2 * DV_{max}}, \quad (8)$$

where
$Dtime_k$ is the estimated time equivalent value of the differentiator voltage $DV_k$ estimated with respect to zero mutual inductance;
DVmax is the maximum value of $DV_k$, if the measurement had been taken at a maximum of the mutual inductance characteristic;
$Htime_{k-1}$ is the output of the Period Observer in the last calculation block, which is the best estimate of half the periodic time of the mutual inductance characteristic between the armature and the field.

The ratiometric quantity is illustrated by FIG. 6, in which the solid line 240 represents a linearised version of the variation expected in differential voltage over the range of rotor angle in half an electrical cycle, changing from positive DVmax (voltage 230) to negative DVmax. In one example $DV_k$ returns a value represented by the voltage 231. The ratio is obtained by division of voltage 231 by voltage 230 and a positive ratio between zero and one is returned. In another example $DV_k$ returns a value represented by the voltage 232, which is negative. The ratio is now obtained by division of voltage 233 by voltage 230 and a negative ratio between zero and one is returned. Multiplication of the ratiometric quantities by the time for one quarter of an electrical cycle 235 gives time value 233 for the reading 231 and a negative time value 234 for the reading 232.

The example shown in FIG. 6 illustrates a linear approximation of the function of the parameter. This will be adequate for the control of most machines but the invention can be extended to provide a non-linear function representing the variation of the position dependent parameter with angle. This could be a sinusoidal or other curved function. This data could be calculated mathematically or stored in a look-up table.

The conversion of the differentiator voltage directly into a time by the equation (8) can be implemented by numerical division. Alternatively since DVmax will be a constant for a given machine, it is relatively simple to approximate the division by a multiplication followed by a digital bit shift to implement a divisor equivalent to a power of two. According to the invention the differentiator voltage has been converted into a time and this time can now be converted into a time error by comparing it to a target time. The target time is dependent on the speed of rotation and the required duration of the armature pulse. The target time must also take into account where the pulse is to be positioned with respect to the mutual inductance characteristic. The target time defines the intended position for the measurement of the active-state differentiator voltage relative to the mutual inductance zero position. In the simplest implementation of the invention, the target time could be set to half the duration of the armature pulse width but a wide range of values could be chosen depending on speed, pulse size, voltage or even set to a constant. If the time duration of the kth armature pulse is $Pulse\_time_k$, then using this example;

$$DVtarget\_time_k = \frac{Pulse\_time_k}{2} \quad (9)$$

An error between the $DVtarget\_time_k$ and the estimated $DVtime_k$ can be calculated using $$DVerror\_time_k = DVtime_k - DVtarget\_time_k \quad (10)$$

The $DVerror\_time_k$ is used to update the Period Observer so that the best estimate for the half period of the mutual inductance characteristic is available for the next calculation. The Period Observer is created from the integration or summation of all the DVerror time terms. Since the errors are already in time units, integration of a sequence of positive and negative time errors will converge on the correct estimate for the value of Htime.

$$\text{Integral of } DVerror\_time_k = \sum_{r=1}^{k} DVerror\_time_r \quad (11)$$

Integral of $DVerror\_time_k =$
Integral of $DVerror\_time_{k-1} + DVerror\_time_k$ $$Htime_k = K_1 * \text{Integral of } DVerror\_time_k \quad (12)$$

Where $K_1$ is the integral gain, controlling the rate at which the integral converges on the result. This value can be selected as appropriate, for the mechanical time constant of the machine.

For most machine time constants, typical values for $K_1$ would be in the range 0.05 to 0.5, though faster convergence can be achieved with a greater $K_1$ and slower convergence in the case of a very high inertia load could use a smaller value of $K_1$. The smaller the value of $K_1$ the less of each error is used to update the Period Observer resulting in a slower update rate but potentially greater stability. In a machine with eight stator teeth and four rotor teeth as shown in FIG. 1, the output from the Period Observer, Htime, is the average time taken for the rotor to turn through 45°.

The aim of the invention is to now use conventional control laws to control the timing of the armature switches. If the $DVerror\_time_k$ is positive then the time estimated from the differentiator voltage measurement is greater than the $DVtarget\_time_k$. This means that the armature pulse must have occurred earlier than the target position for the pulse. This positive error needs to be used to re-calculate the position of the next pulse; positive error requires a positive time shift to be added to the pulse to move the next pulse closer to the target position. A positive DVerror_time$_k$ requires a negative time shift to move the next pulse earlier than would otherwise take place to achieve a pulse position closer to the target position. The value of Htime from the Period Observer is the equivalent of the integral term in a proportional+integral control loop. Adding a proportional term to this integral term therefore gives a new time estimate for the time between consecutive armature pulses, such that the next armature pulse will be repositioned to reduce the future DVerror_time. The new time estimate to be used for the resynchronising of the next armature pulse, Hresynch_time, is given by $$Hresynch\_time_{k+1} = K_P * DVerror\_time_k + K_I * \text{Integral of } DVerror\_time_k$$

$$Hresynch\_time_{k+1} = K_p * DVerrortime_k + Htime_k \quad (13)$$

The value of $K_p$ can also be chosen to suit the dynamics of the machine system and will typically be in the range 0.125 to 2. This completes the pulse position control loop. This pulse position control loop could be done according to the invention with a wide range of other control methodologies including, for example, proportional+integral+derivative.

The output of the Period Observer is the time taken for the rotor of the machine to turn through a fixed angle. In the example given here the output of the period observer was the time for half the period of the mutual inductance characteristic. This is inversely proportional to the speed of the rotor and since it is updated every time the calculation loop is performed, it is a suitable signal for a speed control loop. Any possible speed control loop can therefore be implemented in combination with the position control loop according to this invention. For example a closed loop speed controller could compare the latest value for Htime with a target value for that time to guarantee a particular speed. A time error would be generated which can be used to increase or decrease the size of the next armature pulse, to reduce the magnitude of the error. Such a speed control loop can use conventional control methods such as proportional+integral+derivative or many alternative schemes which are known to those familiar with the art.

On completion of this calculation the timing for the turn off of the present pulse, the off-time between pulses, the turn-on point of the next pulse and the next value for Advance_delay_time can be calculated. The value of Advance_delay_time must always have a minimum value which allows the differentiator voltage to settle. The Advance_delay_time can then be set to larger values to ensure that the measurement of the differentiator voltage in the active region occurs after the maximum or minimum of the mutual inductance characteristic. If this is not done the conversion of the differentiator voltage to a time will be incorrect. Adding a delay to the measurement of the differentiator voltage in the active region therefore allows the turn on point of the armature current to be advanced relative to the measurement of the mutual inductance characteristic.

Implementation of the method according to this invention allows a flux switching machine to be controlled without a position sensor. The measurement of one or two differentiator voltages, representative of rates of change of field current, are converted into a time in a way which then allows a unique combination of a Period Observer and a pulse position control loop to deliver subsequent armature current pulses in the optimum position for torque production, even under conditions of rapid changes in speed. The mathematics of the controller is very simple and can be implemented in a low cost microcontroller and the parameters in the controller do not necessarily need to be adjusted for the machine to operate over a very wide speed range.

One important feature of this invention is the use of the difference between the active-state measurement and the zero-state in the calculating the effect of the armature switching transition on the gradient of the field current. This automatically eliminates any influence of rates of change of field current due to other circuit voltages since comparison of the rate of change of field current immediately before and immediately after an armature switching transition can be attributed to that armature switching event. In this invention the measurement of the differentiator output voltage before and after an armature switching event allows the change in the field current gradient due to the specific armature switching event to be completely isolated from other effects due to variations in voltage around the field winding itself.

Many variations on the method of the invention are possible to suit different controllers. The precise order of the calculations are not particularly critical since every calculation is updated once per calculation cycle. The unique steps are the conversion of the differentiator measurement to a time, this time being automatically compensated for speed, and using this time to produce an error time which in turn is used to update a Period Observer and a pulse position control loop.

One simple modification to the method is to convert the Dratio directly to angular calculations rather than time. Equation (7) can be rewritten as $$Dangle_k = \frac{DV_k}{DV_{max}} * \frac{\pi}{2 * N_r}, \quad (14)$$

where
Dangle$_k$ is the estimated angle (in radians) equivalent value of the differentiator voltage DV$_k$ estimated with respect to zero mutual inductance;
DVmax is the maximum value of DV$_k$, if the measurement had been taken at a maximum of the mutual inductance characteristic;
N$_r$ is the number of rotor poles.

The calculation can then progress to calculate an angular error. The conversion to time will still have to be done later in the calculation as the armature switches often are controlled in real time and the Period Observer is best implemented in time units.

Figure 7:
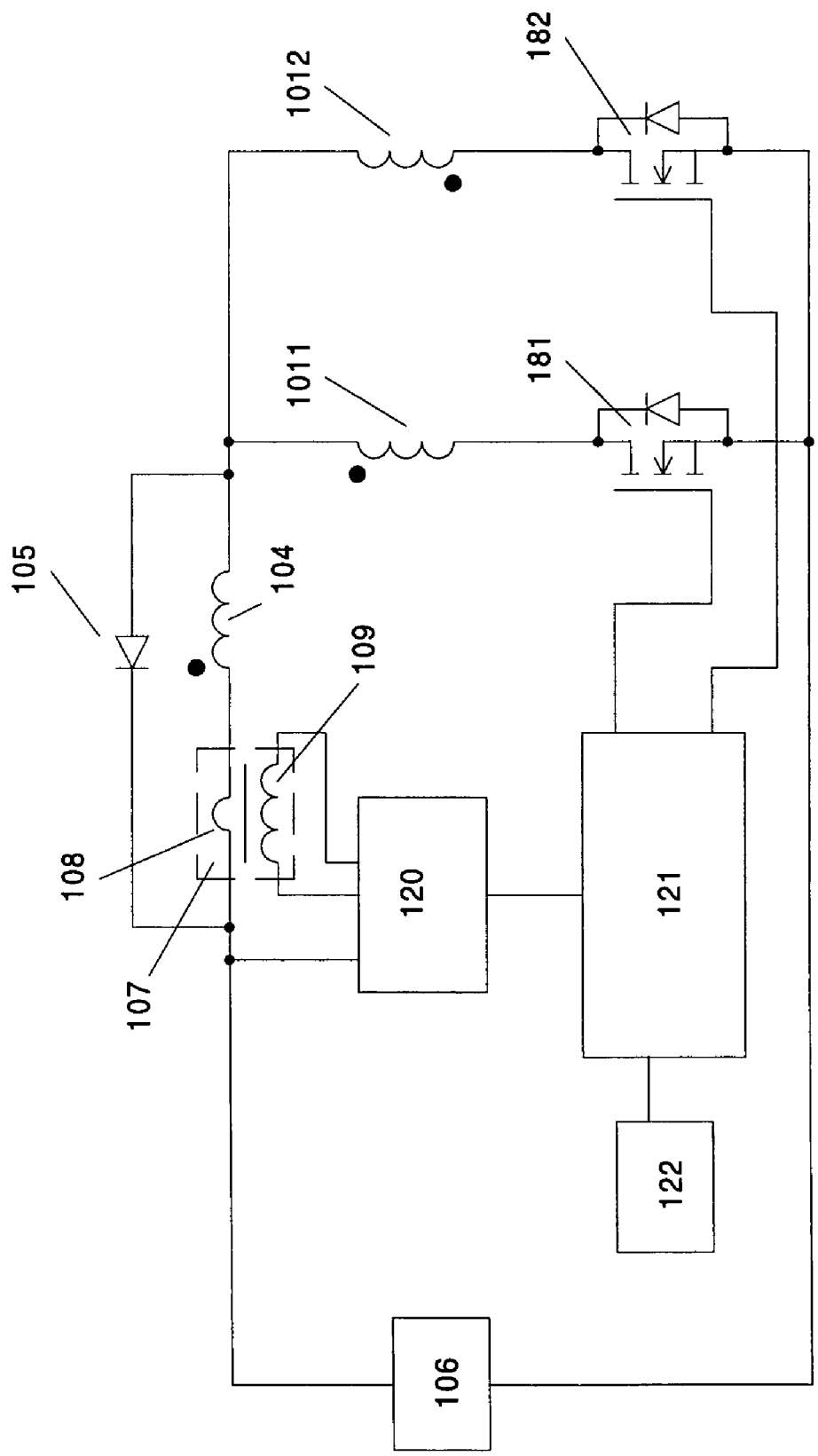
FIG. 7 and FIG. 8 show further power circuits for the control of flux switching motors according to the invention.

The method according to this invention can be applied to other power circuit configurations suitable for the control of armature and field currents in the flux switching machine. In FIG. 7 a power source 106 supplies a motor controller according to the invention applied to a flux switching motor with field winding 104 and armature winding comprising two closely coupled windings 1011 and 1012. The closely coupled armature winding, sometimes known as bifilar windings were disclosed in U.S. Pat. No. 6,140,729. The circuit allows the motor to be controlled using only two power switches 181 and 182. According to aspects of this invention FIG. 7 also contains a differentiator coil 107 with primary 108 comprising a conductor carrying the field current and secondary 109 linking the flux associated with the primary, a sensorless conditioning circuit 120 and a signal controller 121. There may also be an application controller 122. The sensorless conditioning circuit 120 takes the voltage signal across the terminals of the secondary winding of the differentiator coil 107 and may adjust the scale of the signal and add a dc offset so that the signal is appropriately within the range of an analogue to digital converter in the signal controller 121. Furthermore the sensorless conditioning block may include a simple filter to remove unwanted high frequency noise. The signal controller 121 may be a micro-controller with an analogue to digital converter or may be an application specific digital or analogue controller. Implementation of the invention in this circuit is identical to the previous description characterised by having a armature current which has to be reversed in polarity in synchronism with particular positions of the rotor, each armature current cycle being divided into positive and negative armature conduction blocks, characterised by each armature conduction block having an active-state where measurement of a value representing the rate of change of field current can be made and a calculation block which converts the differentiator measurement to a time, this time being automatically compensated for speed to be representative of angle, and using this time to produce an error time which in turn is used to update a Period Observer and a pulse position control loop.

Figure 8:
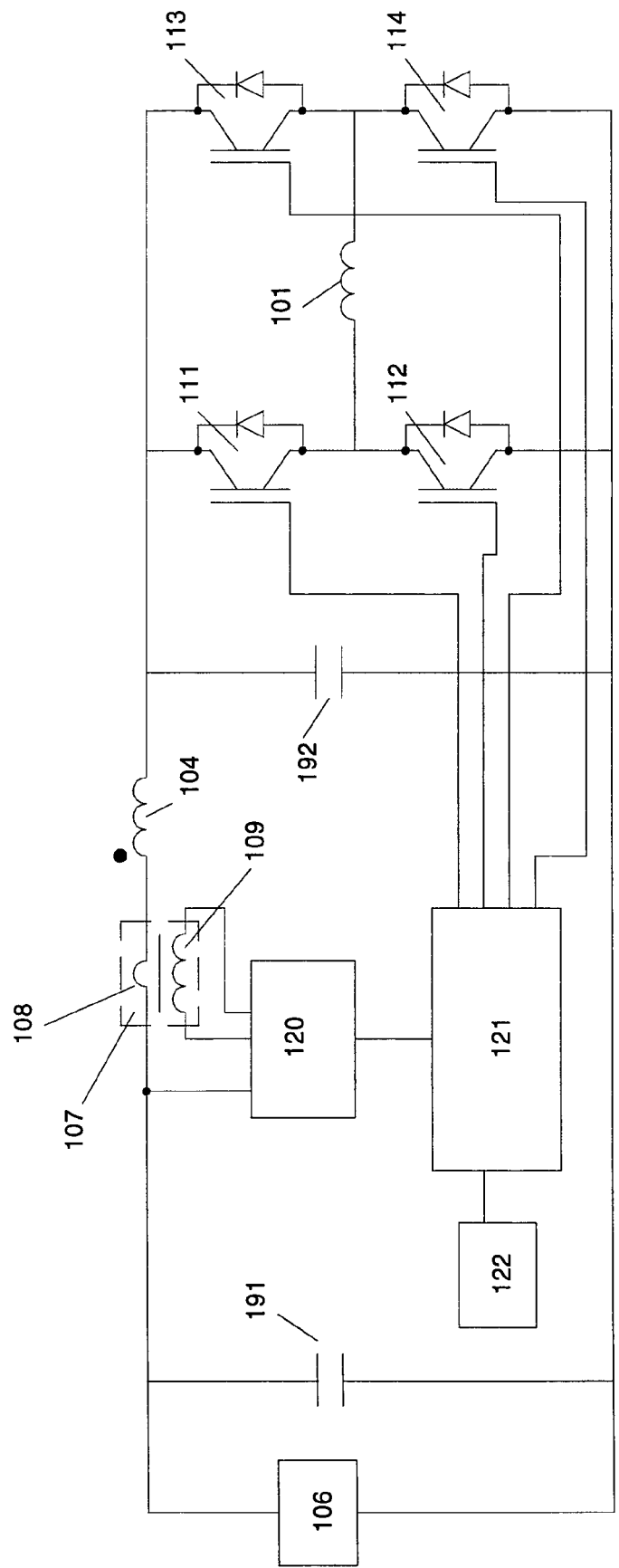

In FIG. 8 a power source 106 supplies a motor controller according to the invention applied to a flux switching motor with field winding 104 and armature winding 101 in a full bridge inverter with 4 IGBTs 111, 112, 113, 114. In FIG. 8 there is no diode around the field winding to carry current when the field and armature currents are different. Instead, two capacitors 191 and 192 are used to allow a path for field current to flow when it is greater than the armature current. Capacitor 192 also absorbs armature current when the armature switches are turned off. According to aspects of this invention FIG. 8 also contains a differentiator coil 107 with primary 108 comprising a conductor carrying the field current and secondary 109 linking the flux associated with the primary conductor, a sensorless conditioning circuit 120 and a signal controller 121. There may also be an application controller 122. The sensorless conditioning circuit 120 takes the voltage signal across the terminals of the secondary winding of the differentiator coil 107 and may adjust the scale of the signal and add a dc offset so that the signal is appropriately within the range of an analog to digital converter in the signal controller 121. Furthermore the sensorless conditioning block may include a simple filter to remove unwanted high frequency noise. The signal controller 121 may be a micro-controller with an analogue to digital converter or may be an application specific digital or analogue controller.

In the circuit of FIG. 8 it is possible that the size of capacitor 192 may be relatively small, perhaps in the region of 2 pF to 20 pF. This means that the voltage across the armature circuit may vary quite significantly within each armature conduction. Use of the divisor method disclosed in European Patent Application EP1783891 provides a differentiator signal which is normalised against the changes in armature supply voltage and allows the method according to this invention to take this normalised differentiator signal measurement and convert it to a time, this time being automatically compensated for speed to be representative of angle, and using this time to produce an error time which in turn is used to update a Period Observer and a pulse position control loop.

The methods according to this invention may be used as part of an overall control scheme. For example the methods according to this invention are particularly useful for control of the motor when it is operating at more than 25% of its rated speed. Below this speed it is common to have pulse width modulation methods to control the armature current and alternative position sensing methods may therefore be more appropriate. When the motor has reached a suitable speed the signal controller may change to the control scheme according to this invention. Pulse width modulation can also be used to control the armature current during the remaining section of a pulse once the appropriate measurements of the differentiator signal have been made in the active region.

The methods according to the invention are applicable to flux switching motors and generators. In a flux switching generator the direction of armature current will be the opposite of that in a motor relative to the rate of change of the mutual inductance between armature and field. Turning on an armature switch in the active region of the armature conduction block in a flux switching motor generates a mutually coupled voltage in the field which tends to create an increasingly negative rate of change of field current as the active region occurs earlier with respect to the mutual inductance characteristic.

Application of this invention to a flux switching generator therefore requires the subtraction of active and zero readings to be reversed by modification of equation (5). Alternatively the sign of DVmax can be reversed. Otherwise the calculation block can proceed as before.

All aspects of the invention described have employed a differentiator coil as a convenient way of producing a differentiator voltage related to the rate of change of current in a winding. The invention can be applied equally well to a circuit which determines the rate of change of current using other methods. This may comprise steps of measuring the current at two or more successive intervals and determining the change in the current over these intervals. Alternatively an analogue differentiator circuit can be used.

Another suitable method to obtain the rate of change of a current is to measure the time taken for the current to change by a preset amount. This can be a useful method for use in a low cost microcontroller where a timer and a comparator are readily available.

Figure 9:
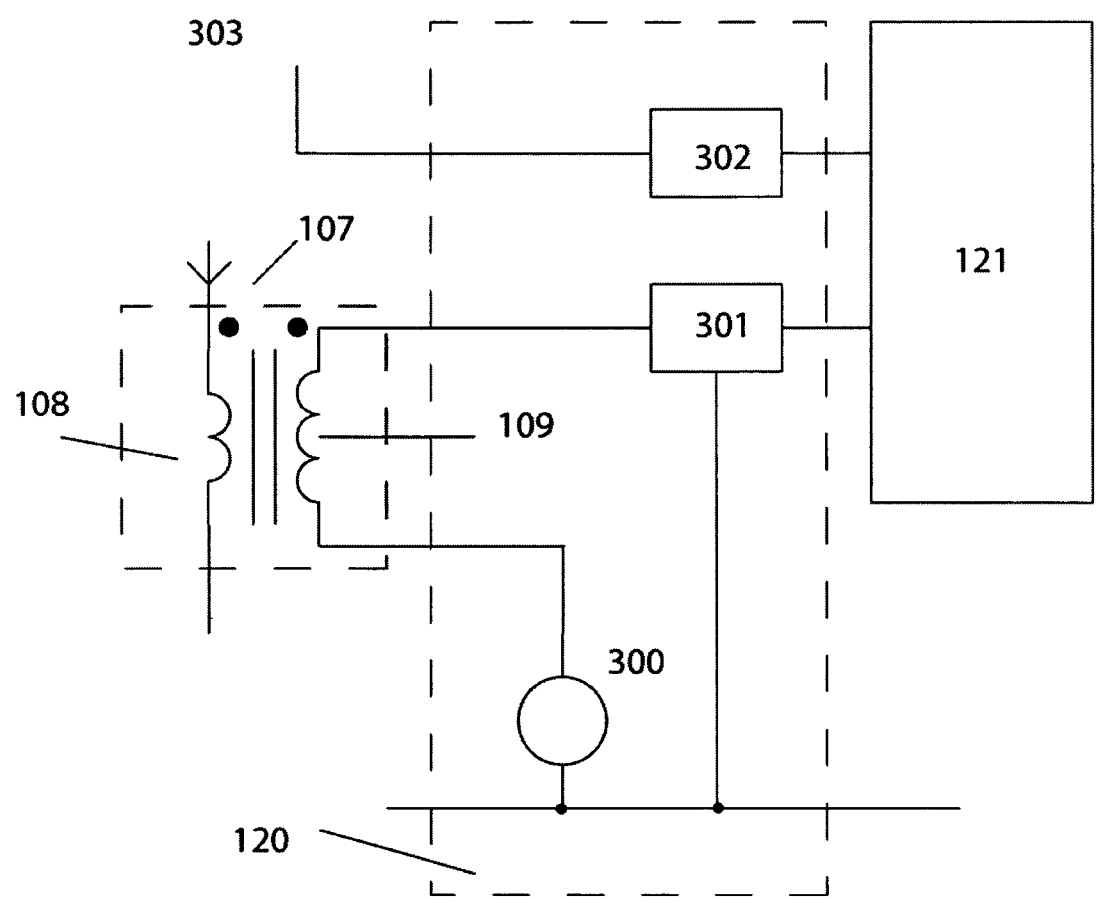
FIG. 9 shows the Sensorless Conditioning Block 120 in more detail.

FIG. 9 shows the Sensorless Conditioning Circuit 120 in more detail. The secondary winding 109 of the differentiator coil 107 has two terminals. The first terminal would typically be connected to a zero or reference voltage 300 which ensures that a dc offset can be added to the differentiator coil output voltage on the second terminal. Since the voltage induced across the terminals of the differentiator coil secondary winding 109 is both positive and negative it is useful to add an offset 300 to make the signal always positive. This is because the measurement of the signal magnitude in the signal controller 121 is usually achieved with an analogue to digital converter with a positive voltage range. The dc offset 300 therefore allows positive and negative rates of change of field current to be measured in a simple analogue to digital converter. The signal at the second (positive) terminal of the secondary winding 109 may also pass through a filter and/or attenuation/amplification block 301 before it is passed to the signal controller 121. Since the signal controller subtracts successive signals the dc offset is eliminated from the measurements.

The sensorless conditioning unit may also receive a signal 303 which may also pass through a block 302. Block 302 may contain filters, amplifiers or attenuators and may also add or subtract voltage offsets. The signal 303 may be representative of the dc supply voltage or the armature supply voltage. It may also be a signal representative of the rate of change of current in the armature winding since it is known that the rate of change of current in the armature winding is the cause of the induced voltage in the field winding. This signal 303 can be used by the signal controller 121 to normalise the differentiator signals against changes in supply voltage.

The aspects of the invention can be applied to flux switching motors with more than one armature winding. The machines illustrated are effectively single phase machines as, whilst the armature is made up of multiple coils around the machine, there is one armature winding and single phase ac voltage is induced in the armature winding. A flux switching machine with eight stator teeth and either three or five rotor teeth can have two armature phases and a single field winding. The mutual inductance characteristic between each of the two armature phases and the field is displaced from the other by 90° electrical. A flux switching machine with twelve stator teeth and either five or seven rotor teeth can have three armature phases and a single field winding. The mutual inductance characteristic between each of the three armature phases and the field is displaced from the other by 120° electrical. Each of the three armature phases will have a mutual inductance variation which is displaced from the others by 120° electrical. Application of the invention to such machines follows exactly the same principles taking care to sample the rate of change of field current at times when the armature switching event which caused the induced effect in the field is known and can be related to the mutual inductance of a single armature phase or a pair of series connected armature phases. In the case of the three phase flux switching machine it is most likely that the three phases will be connected to a three phase inverter and that the armatures will be star or delta connected. In this case switching events in the inverter will change the voltage across two armature phase windings simultaneously. The induced effect in the field winding will then be the combined effect of the mutual coupling between both armature phases and the field winding. The signal controller must use the correct DVmax value for implementation of the calculation block. The DVmax can either be based on a single mutual inductance characteristic or it can combine the mutual effects of two series connected armatures.

The detection of the position in a permanent magnet flux switching motor such as shown in FIG. 2 or as disclosed in a paper "Switching Flux Permanent Magnet Polyphased Synchronous Machines" by E. Hoang, A. H. Ban Ahmed and J. Lucidarme, published in the EPE'97 Conference proceedings pages 3.903 to 3.908 are also possible according to this invention. In such machines the field excitation is supplied completely by permanent magnets in the stator in the same position as the field winding of FIG. 1. Instead of the secondary of a differentiator coil coupling to flux associated with a conductor carrying the field current the secondary of the differentiator coil must link the field flux in the machine itself. This can be achieved by having the secondary of a differentiator coil spanning the air-gap surface of one of the stator steel sections carrying the armature coils and two stator teeth from one magnet position, say 31, to the next magnet position, say 33. The primary source of flux for the differentiator coil is then the field flux passing through either of the stator teeth spanned by each secondary coil and the voltage induced in the secondary coil will be the rate of change of the field flux which will contain changes set up by switching transitions of the armature phases, the magnitude of which will be directly related to position according to changes in mutual coupling of armature phases to the field winding. Such permanent magnet flux switching machines do not suffer from the limitations of field current being in series with armature current. The invention can therefore be applied on the signal induced in the secondary coupled to the field flux in the machine and a greater range of measurement times will be available within the active region. Such a scheme provides for control of the permanent magnet flux switching machine at high currents and under rapid transient conditions. In the three phase permanent magnet machine it may be beneficial to have several secondary coils of the differentiator coil, each secondary linking a different section of the stator so that a full picture of the field flux in the machine is established. The signal controller may implement the invention by sensing the secondaries as a whole series connected unit or as individual coils.

It is possible to apply the aspects of the invention to monitoring rates of change of current in the armature winding, due to switching cycles in the field winding. This would be possible in a flux switching motor with a shunt field controlled with a separate switching transistor rather than the series connected field in the examples given.

The aspects of the invention described herein can also be applied to other electrical machines where there are changes in mutual coupling between the windings or changes in self-inductance and where those changes are a function of position.

The invention would be particularly beneficial to switched reluctance machines. In a switched reluctance machine the mutual coupling between phase windings is relatively small but the variation in self inductance is significant. Application of the invention can be achieved by using the differentiator to determine the rate of change of current in an active winding. The rate of change of current in a phase winding of a switched reluctance machine immediately after application of the phase voltage is a direct function of position. In a switched reluctance machine the self inductance is lower near to an unaligned position; the position where the rotor teeth are unaligned with the stator teeth of the phase winding being energised. As the rotor is moved to an aligned position the self inductance increases reaching a maximum when the rotor teeth are completely aligned with the stator teeth of the phase winding being energised. Therefore in a switched reluctance motor, when a phase winding begins an active region, the rate of change of phase winding current will be higher the closer the start of the active region is to the unaligned position. As is well known in prior art methods for control of switched reluctance machines without sensors the rate of change of phase current is therefore a direct measure of rotor position. This invention provides a new way to control the position of the phase winding pulse relative to the rotor position by conversion of the rate of change of the phase current into a time, automatically compensating that time for speed, comparing the estimated time with a target time to produce an error time and then using the error time to update a period observer and to drive a pulse position control loop. In this way the position of each phase current pulse in a switched reluctance machine can easily be controlled. The invention can be applied to each phase winding of the motor in turn which therefore increases the update rate of the feedback to the controller. Alternatively one phase can be used to update the timings of any other phases in synchronism with the measured phase winding.

In a switched reluctance machine it may be preferable to make the measurements of the rate of change of current at the end of the active region and at the start of the return-region or at the end of the return region and the start of the off region. This is because as the power and speed of a machine increases the start of the active region needs to be moved closer to and beyond the minimum inductance position. If the start of the active region is initiated before the minimum inductance position has been reached (inductance is still falling to its minimum value), the initial value of the rate of change of current will be reduced and an incorrect position will be calculated as there are two positions corresponding to the measured value of rate of change of phase current. Under these conditions the end of the active-state and start of the return-state occur at a point which is before the maximum of the self-inductance characteristic. By setting the appropriate value of DVmax to convert the readings into time and setting the correct DVtarget_time corresponding to the desired position of this point relative to the self inductance characteristic, the invention can then be applied exactly as before. The value of DVmax at the end of the active-state is more difficult to determine as it is a non-linear function of the current. An ideal solution is therefore to use a measurement of DV at the end of the active region to recalculate the DVtime obtained from the reading at the start of the active region. As a result of implementing this invention on a switched reluctance machine many of the limitations of previous sensorless position control schemes are eliminated. In particular:—

(i) the need for a complex non-linear model of the self-inductance variation with current is eliminated;
(ii) the need to measure actual current is eliminated since the method requires a simple measurement of the rate of change of current which can be implemented with a simple coupled coil on a printed circuit board;
(iii) the calculations can be implemented very easily allowing the control scheme to be operated at very high speeds;
(iv) the method does not require the creation of complex look-up tables which create discontinuities in the control scheme, leading to instabilities in the control.

The invention can be implemented in all motor types with the calculation loop running less frequently than the period or half period of the variation in the position dependent parameter. This can be particularly effective at high rotational speeds where more processing time is required to complete the calculation loop than the electrical cycle time of the current in the motor windings.

The invention could also be implemented in a motor where the position dependent parameter is a back emf voltage. The back emf can be measured or calculated from direct or indirect electrical measurement. If DVmax is then set to the peak value of the back emf at the instantaneous machine speed the measured back emf can be converted to a time, independent of speed and used to produce a time error which can drive a Period Observer and update the pulse positioning timing in the next cycle.

The methods according to this invention are particularly beneficial to the control of permanent magnet machines because the conversion of the emf to a ratiometric quantity representative of rotor position reduces the dependence of the signal on accurate motor models.

The invention claimed is:

1. An electrical machine system for converting electrical energy into mechanical energy and/or mechanical energy into electrical energy,
the machine comprising a stator and a rotor,
the stator having one or more electrical windings wherein at least one electrical parameter of the windings have a cyclic variation related to rotor position;
at least one control device for controlling supply of electrical current to or from the or each said electrical winding, and
at least one rotor position sensor means for detecting at least one electrical signal related to the cyclic variation of at least one electrical parameter of the or each said electrical winding wherein at least one said rotor position sensor means comprises the steps of measuring the said electrical signal at least once during any part of an electrical cycle, conversion of the at least one measured electrical signal to a ratiometric quantity representative of an estimate of the rotor position, conversion of the ratiometric quantity directly into a time quantity by multiplication of the ratiometric quantity by a time representing a proportion of the period of the cyclic variation in the electrical parameter and using the said time quantity in a calculation to maintain the current passing through the or each said electrical winding in synchronism with rotor rotation.

2. An electrical machine system according to claim 1 wherein the at least one electrical signal corresponds to the rate of change of an electrical current in at least one electrical winding of the machine.

3. An electrical machine system according to claim 1 wherein the at least one electrical signal corresponds to the rate of change of a magnetic flux in a part of the electrical machine.

4. An electrical machine system according to claim 1 wherein the rotor position sensor device determines an error time value between the said time quantity and a target time.

5. An electrical machine system according to claim 4 wherein the rotor position sensor device includes a period observer based on integration or summation of the error time values.

6. An electrical machine system according to claim 4 wherein the rotor position sensor device uses the error time value in a position control loop.

7. An electrical machine system according to claim 5 wherein the rotor position sensor means uses the period observer in combination with the error time value in a position control loop.

8. An electrical machine system according to claim 3 wherein the at least one electrical signal corresponds to the rate of change of a magnetic flux linking an electrical winding of the stator as a result of rotation of a rotor carrying permanent magnets wherein the said electrical signal is measured at least once during any part of an electrical cycle, and converted to a ratiometric quantity representative of an estimate of the rotor position and using the said ratiometric quantity in a calculation to maintain the current passing through the or each said electrical winding in synchronism with rotor rotation.

9. An electrical machine system according to claim 1 wherein the electrical machine also has (i) at least one field magnet device for generating a first magnetomotive force between said rotor and said stator and including at least one first electrical winding, and (ii) at least one armature magnet device including at least one second electrical winding adapted to carry electrical current varying in synchronism with rotation of said rotor relative to said stator to generate a second magnetomotive force having a component transverse to said first magnetomotive force; the at least one control device controlling supply of electrical current to or from the or each said second electrical winding wherein the electrical current in the or each said second electrical winding has positive and negative conduction blocks; and the at least one rotor position sensor means detects at least one electrical signal related to the rotational position of the rotor relative to the stator induced in a respective said first or second electrical winding as a result of a current passing through a respective second or first electrical winding, wherein at least one said rotor position sensor means comprises the steps of conversion of the at least one electrical signal to a ratiometric value representative of angle and using the said value in a calculation to control the subsequent current passing through the or each said electrical winding.

10. An electrical machine system according to claim 1, incorporating a brushless flux switching machine.

11. An electrical machine system according to claim 1, incorporating a switched reluctance machine.

12. An electrical machine system according to claim 1, incorporating a brushless permanent magnet machine.

13. An electrical machine system for converting electrical energy into mechanical energy and/or mechanical energy into electrical energy,
- the machine comprising a stator and a rotor,
- the stator having one or more electrical windings wherein at least one electrical parameter of the windings have a cyclic variation related to rotor position;
- at least one control device for controlling supply of electrical current to or from the or each said electrical winding, and
- at least one rotor position sensor means for detecting at least one electrical signal related to the cyclic variation of at least one electrical parameter of the or each said electrical winding wherein at least one said rotor position sensor means comprises the steps of measuring the said electrical signal at least once during any part of an electrical cycle, conversion of the at least one measured electrical signal to a ratiometric quantity representative of an estimate of the rotor position, conversion of the ratiometric quantity directly into an angle quantity by multiplication by an angle representing a proportion of the angle corresponding to the cyclic variation in the electrical parameter and using the said angle quantity in a calculation to maintain the current passing through the or each said electrical winding in synchronism with rotor rotation.

14. An electrical machine system according to claim 13 wherein the rotor position sensor device determines an error angle value between the said angle quantity and a target angle.

* * * * *